United States Patent [19]

Hayakawa et al.

[11] Patent Number: 5,227,977
[45] Date of Patent: Jul. 13, 1993

[54] EMBROIDERY DATA PROCESSING APPARATUS

[75] Inventors: Atsuya Hayakawa; Kyoji Komuro, both of Nagoya, Japan

[73] Assignee: Brother Kogyo Kabushiki Kaisha, Japan

[21] Appl. No.: 695,582

[22] Filed: May 3, 1991

[30] Foreign Application Priority Data

May 10, 1990 [JP] Japan ................... 2-120877

[51] Int. Cl.⁵ .................... G06F 15/46; D05B 21/00
[52] U.S. Cl. ...................... 364/470; 112/103; 112/121.12
[58] Field of Search .......... 364/470; 112/103, 112.11, 112/112.12, 445, 266.1, 262.3, 456, 457

[56] References Cited

U.S. PATENT DOCUMENTS

| | | |
|---|---|---|
| 4,385,570 | 5/1983 | Yanagi . |
| 4,388,883 | 6/1983 | Hirota et al. . |
| 4,982,674 | 1/1991 | Hayakawa .................. 364/470 |
| 5,005,500 | 4/1991 | Kato et al. ................... 364/470 |
| 5,054,408 | 10/1991 | Hayakawa .................. 364/470 |

FOREIGN PATENT DOCUMENTS

63-206275 8/1988 Japan .
63-212394 9/1988 Japan .

*Primary Examiner*—Jerry Smith
*Assistant Examiner*—Thomas E. Brown
*Attorney, Agent, or Firm*—Oliff & Berridge

[57] ABSTRACT

An apparatus for processing embroidery data utilized by a sewing machine for forming zigzag stitches, including a first and a second memories for storing point data indicative of positions of a series of points and a width of zigzag stitches. The apparatus further includes a producing device for, by utilizing the point data and the width data, determining a first and a second virtual line for each of line segments each of which connects between a corresponding one of pairs of adjacent two points out of the series of points, such that the first and second virtual lines are parallel to the each line segment and are spaced apart from each other by the width, and producing block data representative of a trapezoid bounded by a first and a second base parallel to each other and a first and a second leg which are not parallel to each other.

17 Claims, 16 Drawing Sheets

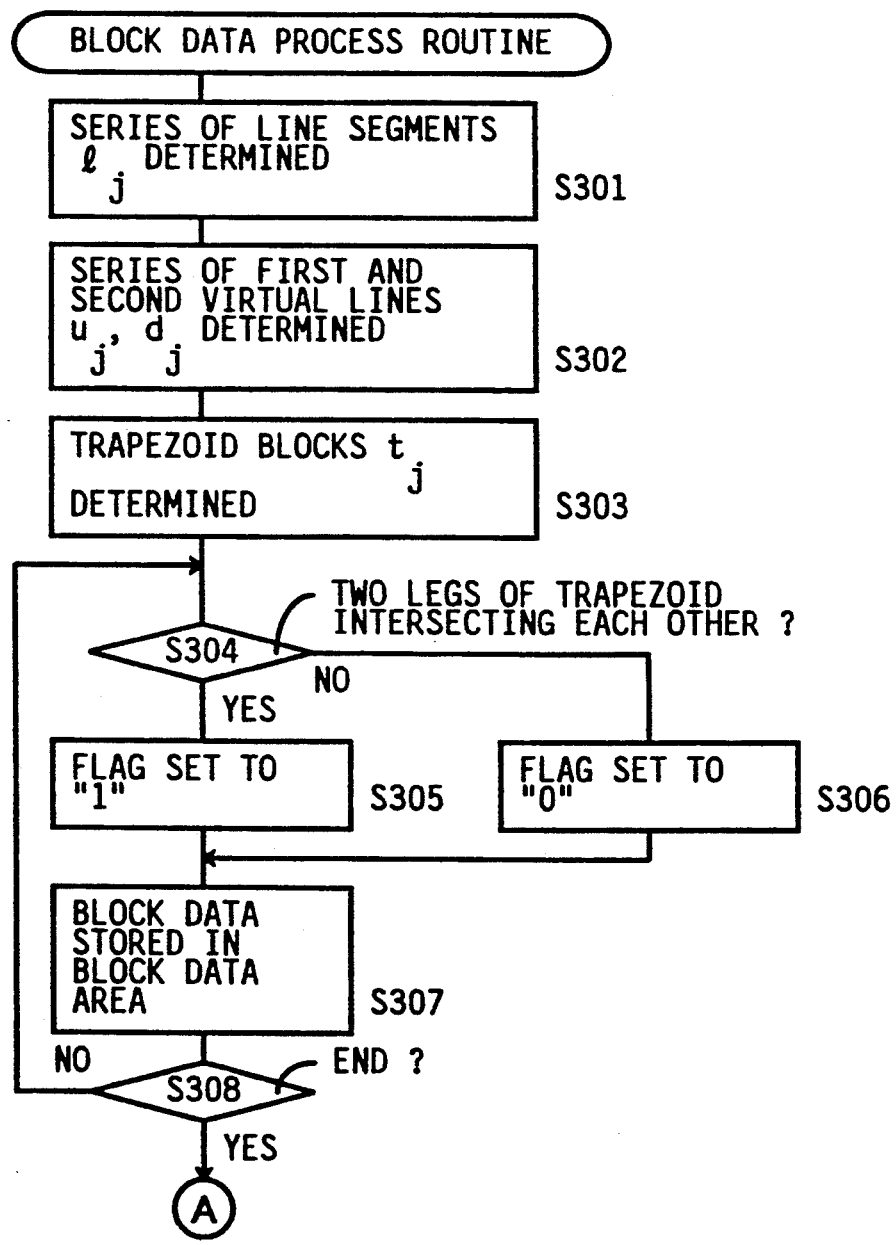

EMBROIDERY DATA PROCESSING APPARATUS

BACKGROUND OF THE INVENTION

1. Field of the Invention

The present invention generally relates to an apparatus for processing embroidery data utilized by a sewing machine and particularly to such an apparatus for producing data used for embroidering an area such as a character or pattern by forming zigzag stitches with a predetermined width along a line or lines defining the character or pattern.

2. Related Art Statement

The Assignee of the present U.S. patent application has filed Japanese Patent Application No. 1-276700 on Oct. 24, 1989, which discloses an apparatus for automatically processing embroidery data used for embroidering a character or pattern (hereinafter referred to as the "figure") by forming zigzag stitches having a predetermined width along a line or lines (hereinafter referred to as the "line") defining the figure.

The proposed apparatus processes embroidery data by utilizing sets of point data indicative of positions of a series of points on a line, and width data indicative of a predetermined width of the zigzag stitches to be formed along the line. The line may be either a polygonal line or a curved line. In the former case, the series of points consist of vertices of the polygonal line, and in the latter case the series of points consist of vertices of a polygonal line approximating the curved line. The apparatus divides a figure or embroidery area defined by a line and a zigzag stitch width, into a plurality of blocks each having a shape of trapezoid (hereinafter, referred to as the "trapezoid blocks" or, when appropriate, "trapezoids"). More specifically described, the apparatus determines a first and a second virtual straight line with respect to each of straight line segments each of which connects between a corresponding one of pairs of adjacent two points out of a series of points on the line, such that the first and second virtual lines are parallel to, and respectively located on both sides of, the each line segment, and are spaced apart from each other by a distance equal to the zigzag stitch width, and produces block data representative of a trapezoid block, namely, trapezoid bounded by (a) a first base connecting between a first intersection between the first virtual line corresponding to the each line segment and the first virtual line corresponding to one of two line segments adjacent to, and on both sides of, the line segment, and a second intersection between the first virtual line corresponding to the each line segment and the first virtual line corresponding to the other of the two line segments, (b) a second base connecting between a third intersection between the second virtual line corresponding to the each line segment and the second virtual line corresponding to the above-indicated one of the two line segments, and a fourth intersection between the second virtual line corresponding to the each line segment and the second virtual line corresponding to the above-indicated other of the two line segments, (c) a first leg connecting between the first and third intersections, and (d) a second leg connecting between the second and fourth intersections. Sets of block data representative of trapezoid blocks as divisions of the figure produced may be utilized as a batch of embroidery data for embroidering the figure. For embroidering the figure by forming zigzag stitches along the line defining the figure, it is necessary to produce sets of stitch position data representative of stitch positions where a stitch needle pieces a workpiece or fabric. An automatic sewing machine may be adapted to produce stitch position data by utilizing block data, while at the same time forming zigzag stitches according the stitch position data produced.

Thus, the proposed apparatus automatically produces embroidery data by dividing a figure having a predetermined width into a plurality of trapezoid blocks, each of which is to be filled with zigzag stitches having the predetermined width.

However, the above-identified apparatus suffers from a problem that, in the event that a length of a line segment connecting between adjacent two points out of a series of points is small in comparison with a zigzag stitch width, a number of stitches may overlap each other, thereby failing to provide an embroidery having an excellent external appearance. In the event that the distance between adjacent two points is great in comparison with the zigzag stitch width, as shown in FIG. 21, for example, zigzag stitches formed by alternately connecting the two bases, AC and BD, of trapezoid block, ABCD, do not overlap each other, thereby providing an excellent embroidery, because block ABCD is a normal trapezoid whose two legs, AB and CD, do not intersect each other. On the other hand, in the event that the distance between adjacent two points is small relatively to the zigzag stitch width, as shown in FIG. 22, for example, zigzag stitches formed by alternately connecting the two bases, AC and BD, of trapezoid block, ABCD, overlap each other, thereby failing to provide an excellent embroidery, because block ABCD is an abnormal trapezoid whose two legs, AB and CD, intersect each other and which, therefore, consists of two triangles connected to each other at their common vertex.

SUMMARY OF THE INVENTION

It is therefore an object of the present invention to provide a data processing apparatus for processing embroidery data according to which an excellent embroidery is formed even where a distance between adjacent two points is small in comparison with a zigzag stitch width.

The above object has been achieved by the present invention which provides a data processing apparatus for processing embroidery data utilized by a sewing machine for forming zigzag stitches, comprising (a) first storing means for storing point data indicative of positions of a series of points on a line defining a figure in which the zigzag stitches are formed with a predetermined width, (b) second storing means for storing width data indicative of the predetermined width of the zigzag stitches, (c) producing means for, by utilizing the point data and the width data, determining a first and a second virtual straight line with respect to each of straight line segments each of which connects between a corresponding one of pairs of adjacent two points out of the series of points, such that the first and second virtual lines are parallel to the each line segment and are spaced apart from each other by the predetermined width, the producing means producing block data representative of a trapezoid bounded by (1) a first base connecting between a first intersection between the first virtual line corresponding to the each line segment and the first virtual line corresponding to one of the two line segments adjacent to, and on both sides of, the each line segment, and a second intersection between the first virtual line corresponding to the each line segment and the first virtual line corresponding to the other of the two line segments, (2) a second base connecting between a third intersection between the second virtual line corresponding to the each line segment and the second virtual line corresponding to the one of the two line segments, and a fourth intersection between the second virtual line corresponding to the each line segment and the second virtual line corresponding to the other of the two line segments, (3) a first leg connecting between the first and third intersections, and (4) a second leg connecting between the second and fourth intersections, and (d) modifying means for, if the trapezoid is an abnormal trapezoid characterized in that the first and second legs intersect each other, modifying the block data into different block data representative of a normal trapezoid having two legs which do not intersect each other.

In the data processing apparatus constructed as described above, the producing means produces sets of block data by utilizing sets of point data stored in the first storing means and width data stored in the second storing means. If trapezoid blocks represented by the sets of block data include an abnormal trapezoid block whose two legs intersect each other, the modifying means modifies the abnormal trapezoid block into a normal trapezoid block. Thus, all the trapezoid blocks to be filled with zigzag stitches are normal trapezoid blocks whose two legs do not intersect each other. Consequently, zigzag stitches are formed in normal trapezoid blocks and therefore none of them overlap each other. As a result, an excellent embroidery is produced.

The modifying means may be embodied in various ways. For example, the modifying means may be embodied such that, each time an abnormal trapezoid block is produced by the producing means, then the modifying means modifies the abnormal trapezoid block and a normal trapezoid block which has been produced immediately before the abnormal trapezoid block, into a new normal trapezoid block. Alternatively, the modifying means may be embodied such that the modifying means is operated after the producing means has completely divided an embroidery figure into trapezoid blocks which may include one or more abnormal trapezoid blocks. In this case, the modifying means may modify an abnormal trapezoid block, or two or more continuous abnormal trapezoid blocks, together with two normal trapezoid blocks adjacent to, and on both sides, of the abnormal trapezoid block group consisting of the one or more continuous abnormal trapezoid blocks.

According a feature of the present invention, each of the first and second virtual straight lines is spaced apart from the each straight line segment (i.e., part of the figure-defining line, or part of a polygonal line approximating the figure-defining line) by a same distance equal to half the predetermined zigzag stitch width. However, it is possible that the distance between the first virtual line and the each line segment defer from the distance between the second virtual line and the each line segment. Furthermore, it is possible that, in an extreme case, one of the first and second virtual lines coincide with the each line segment. However, an abnormal trapezoid block cannot be produced in the case where none of the first and second virtual lines are located on the side of a smaller one of two angles contained by the each line segment and either one of the two line segments adjacent thereto. Therefore, the present invention does not produce the advantage when being applied to the case where one of the first and second virtual lines is located just on the each line segment and simultaneously the other virtual line is located on the side of a greater one of the two angles contained by the each line segments and either one of the two line segments adjacent thereto.

In a preferred embodiment of the present invention, the modifying means comprises first means for, if trapezoids represented by sets of block data produced by the producing means include an abnormal trapezoid group consisting of one or more continuous abnormal trapezoids and two normal trapezoids adjacent to, and on both sides of, the abnormal trapezoid group, modifying the one or more abnormal trapezoids and the adjacent two normal trapezoids, into two new normal trapezoids which have a common leg connecting between an intersection of the two first virtual lines corresponding to the adjacent two normal trapezoids and an intersection of the two second virtual lines corresponding to the adjacent two normal trapezoids, each of the two new normal trapezoids having, as a leg thereof different from the common leg, a distant one of the two legs of a corresponding one of the adjacent two normal trapezoids, the distant one leg being spaced apart from the abnormal trapezoid group.

In another embodiment of the present invention, the modifying means comprises second means for, if trapezoids represented by sets of block data produced by the producing means include an abnormal trapezoid group consisting of one or more continuous abnormal trapezoids, modifying the abnormal trapezoid group and two trapezoids adjacent to, and on both sides of, the abnormal trapezoid group, into two normal trapezoids which have a common leg connecting between an intersection of the first virtual line corresponding to one of the adjacent two trapezoids and the second virtual line corresponding to the other of the adjacent two trapezoids, and an intersection of the second virtual line corresponding to the one of the adjacent two trapezoids and the first virtual line corresponding to the other of the adjacent two trapezoids, each of the two normal trapezoids having, as a leg thereof different from the common leg, a distant one of the two legs of a corresponding one of the adjacent two trapezoids, the distant one leg being spaced apart from the abnormal trapezoid. The second means may be adapted to modify the abnormal trapezoid group consisting of one or more continuous abnormal trapezoids and two normal trapezoids adjacent to, and on both sides of, the abnormal trapezoid group, into two new normal trapezoids. In addition, the second means may be adapted to modify the abnormal trapezoid group consisting of two or more continuous abnormal trapezoids and a normal trapezoid adjacent to, and on one side of, the abnormal trapezoid group, into two new normal trapezoids. Furthermore, the second means may be adapted to modify the abnormal trapezoid group consisting of three or more continuous abnormal trapezoids, into two normal trapezoids.

Since the modification effected by the above-indicated first or second means is simple and therefore is completed in a very short time, the embroidery data processing operation is carried out with high efficiency.

In yet another embodiment of the present invention, the modifying means comprises the above-indicated first and second means, and select means for selecting one of the first and second means. The select means may be adapted to select the first or second means based on a parameter, such as direction or angle, associated with the figure-defining line or the straight line segments. For instance, the select means may select the first means if a smaller one of two angles contained by prolonged lines of the two straight line segments corresponding to the two normal trapezoids adjacent to the abnormal trapezoid group exceeds a reference angle, and select the second means if otherwise. The reference angle may be 90 degrees. In addition, the select means may be adapted such that the select means is operated by an operator for selecting the first or second means, either during an embroidering operation of a figure, or between successive embroidering operations of figures with the first or second means being fixed during the embroidering of each individual figure. Since the way of modification of the first means differs from that of the second means, external appearance of zigzag stitches formed by using the block data provided by the first means differs from that by the second means. Thus, by operating such a selecting means, the operator selects the more appropriate one of the first and second means for producing the more excellent embroidery.

BRIEF DESCRIPTION OF THE DRAWINGS

The above and optional objects, features and advantages of the present invention will be better understood by reading the following detailed description of the presently preferred embodiments of the invention when considered in conjunction with the accompanying drawings, in which:

FIGS. 5A and 5B are flow charts including substeps effected in Step S3 of the flow chart of FIG. 4;

DETAILED DESCRIPTION OF THE PREFERRED EMBODIMENTS

Figure 1:
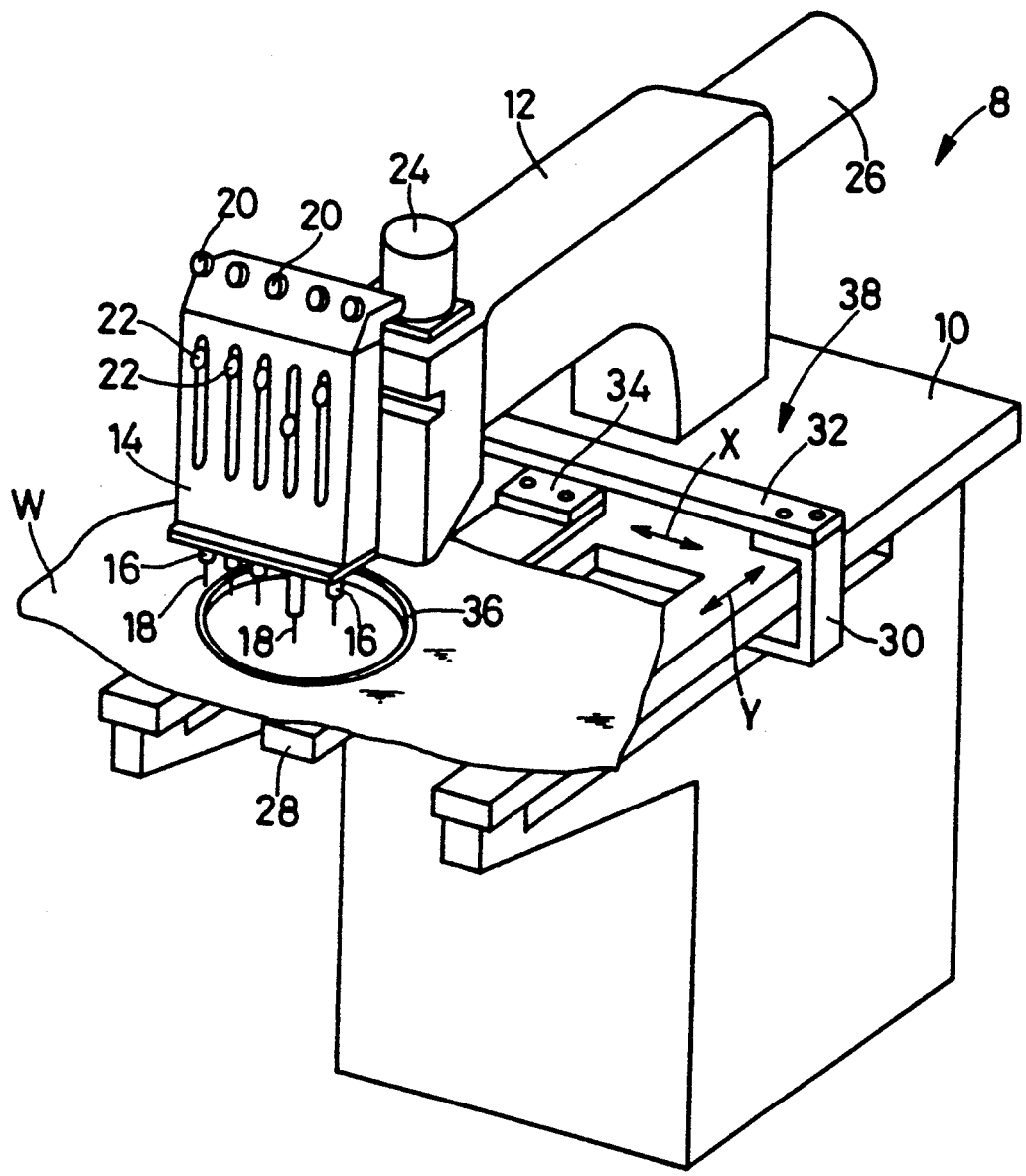
FIG. 1 is a perspective view of an automatic sewing machine having an embroidery data processing apparatus embodying the present invention.

Referring first to FIG. 1, there is shown an automatic sewing machine 8 which forms an embroidery by using embroidery data produced by a data processing apparatus embodying the present invention. The sewing machine 8 includes a table 10 on which a machine main body with a horizontal arm 12 is provided. A needle bar support case 14 is secured to a free end of the arm 12 such that the case 14 is displaceable in a direction parallel to the table 10 and perpendicular to the arm 12. The case 14 supports five needle bars 16, and each needle bar 16 is capable of vertical reciprocation. A stitch needle 18 is fixed to a lower end of each needle bar 16. The five needles 18 are fed respectively with different sorts of threads from respective thread supplies (not shown) via tension thread guide assemblies 20 and thread take-up levers 22. The support case 14 is displaced by being driven by a needle select motor 24, so that a selected one of the five needle bars 16 or needles 18 is located at an operative position above the table 10.

The selected needle bar 16 at the operative position is connected to a main motor 26 via a power transmission (not shown), so that the needle 18 is endwise reciprocated by being driven by the motor 26. A bed 28 extends horizontally from the table 10 such that an end portion of the bed 28 is opposed to the needle bar 16 at the operative position. The end portion of the bed 28 supports a thread loop hooking assembly (not shown) which cooperates with the needle 18 to form zigzag stitches on a workpiece or fabric W.

On both lateral sides of the table 10, there are provided two Y-direction movable frames 30, 30 (only one is shown in FIG. 1), respectively, such that the frames 30, 30 are movable in a Y direction indicated at an arrow in FIG. 1. The frames 30, 30 is displaced by a desired distance in a positive or a negative direction of the Y direction by being driven by a Y drive motor (not shown). A support frame 32 is fixed at opposite ends thereof to the two Y-direction movable frames 30, 30, respectively. The support frame 32 supports an X-direction movable frame 34 such that the frame 34 is movable in an X direction indicated at an arrow in FIG. 1, the X direction being perpendicular to the Y direction. The frame 34 is displaced by a desired distance in a positive or a negative direction of the X direction by being driven by an X drive motor (not shown). A workholder 36 for holding the workpiece W is secured to a free end of the X-direction movable frame 34. Thus, the workholder 36 is moved to a desired position in an orthogonal X-Y coordinate system defined by the X and Y directions. The Y direction movable frame 30, Y drive motor, X direction movable frame 34, X drive motor, workholder 36, and others cooperate with one another to constitute a workpiece feed device. 38.

Figure 2:
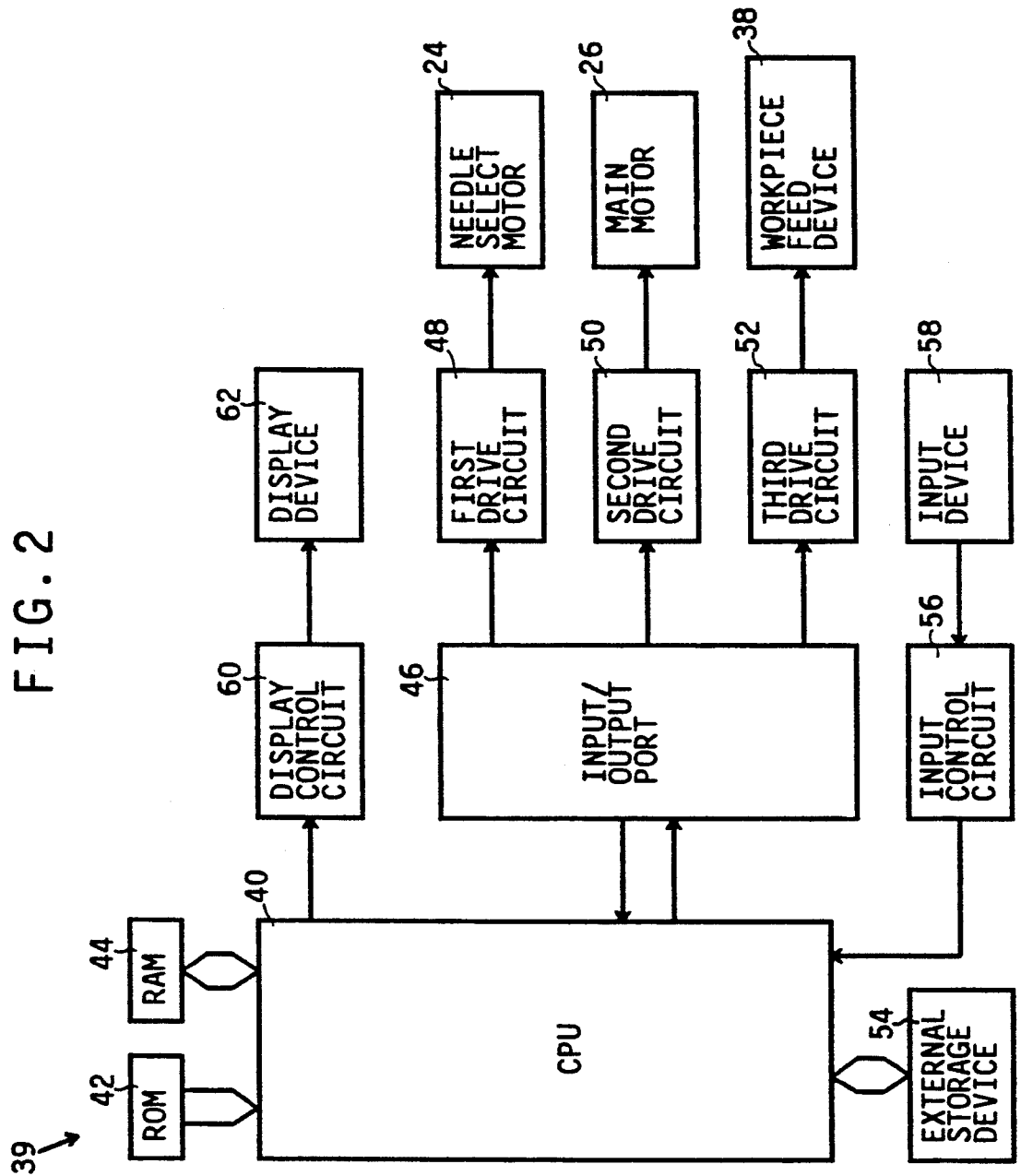
FIG. 2 is a diagrammatic view of an electric control device of the sewing machine of FIG. 1.

Referring next to FIG. 2, there is shown an electric control device 39 of the sewing machine 8. The control device 39 consists essentially of a computer including a central processing unit (CPU) 40, a read only memory (ROM) 42, and a random access memory (RAM) 44. A first, a second, and a third drive circuit 48, 50, 52 for respectively driving the needle select motor 24, main motor 26, and workpiece feed device 38 each are connected to the CPU 40 via an input/output port 46. In addition, an external storage device 54 for storing data on a recording medium such as a magnetic disc or tape is connected to the CPU 40. Further, an input device 58 is connected to the CPU 40 via an input control circuit 56, and a display device 62 is connected to the CPU 40 via a display control circuit 60. The input device 58 is used by an operator for commanding commencement of an embroidery data processing operation or an embroidering operation (i.e., zigzag sewing operation), or selection of a desired batch of point data indicative of positions of a series of points on a line defining a figure in which zigzag stitches are formed. The input device 58 includes a keyboard and a point designating tool such as a so-called "mouse". The display device 62 is used by the operator for viewing the series of points represented by a selected batch of point data, or trapezoid blocks (described later in detail) utilized for forming zigzag stitches. The display device 62 includes a cathode ray tube, for example.

Figure 3:
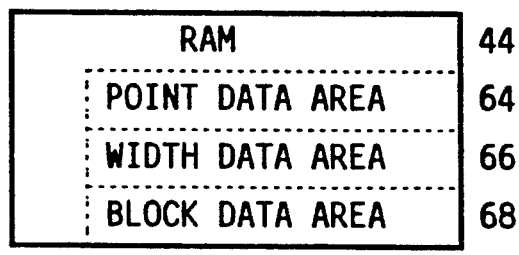
FIG. 3 is a view illustrating the arrangement of a RAM of the control device of FIG. 2.

As shown in FIG. 3, the RAM 44 includes, in addition to working area, a point data area 64 for storing point data; a width data area 66 for storing width data indicative of a zigzag stitch width; and a block data area 68 for storing block data representative of trapezoid blocks. The ROM 42 stores an embroidery data process program represented by the flow charts of FIGS. 4 and 5, as well as other control programs used for operating the sewing machine 8.

Hereinafter, there will be described the embroidery data processing operation carried out by the data processing apparatus, by reference to the flow charts of FIGS. 4 and 5.

First, the control of the CPU 40 begins with Step S1 to read a selected batch of point data from the external storage device 54 and store the point data in the point data area 64 of the RAM 44. The batch of point data had been input or prepared by an operator through the input device 58 and stored in the external storage device 54.

Subsequently, the control proceeds with Step S2 to read zigzag stitch width data from the external storage device 54 and store the width data in the width data area 66 of the RAM 44. Based on the width data, the CPU 40 commands the display device 62 to indicate the value of zigzag stitch width. In the event that the operator wishes to change the zigzag stitch width, the operator may input a desired width value through the input device 58, so that the content of the width data area 66 is updated.

Step S2 is followed by Step S3 in which sets of block data are produced based on the point data and the width data. Subsequently, in Step S4, the block data are stored as embroidery data in the external storage device 54.

Figure 4:
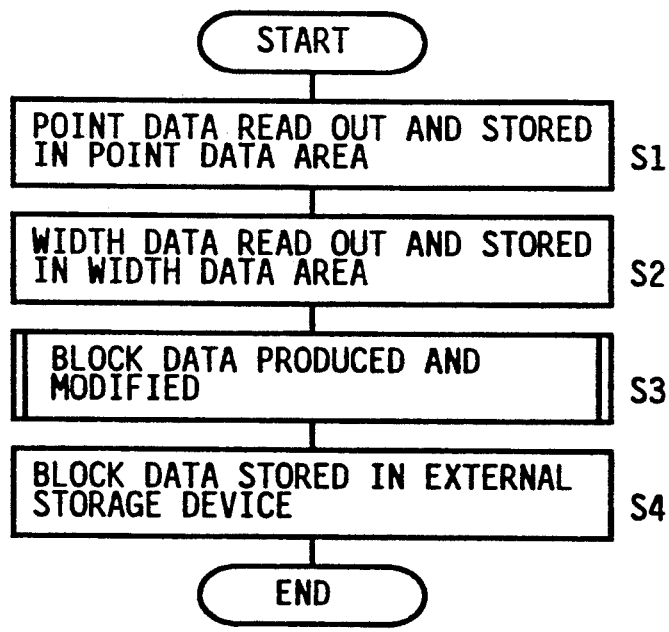
FIG. 4 is a flow chart representing an embroidery data process program stored in a ROM of the control device of FIG. 2.
Figure 5B:
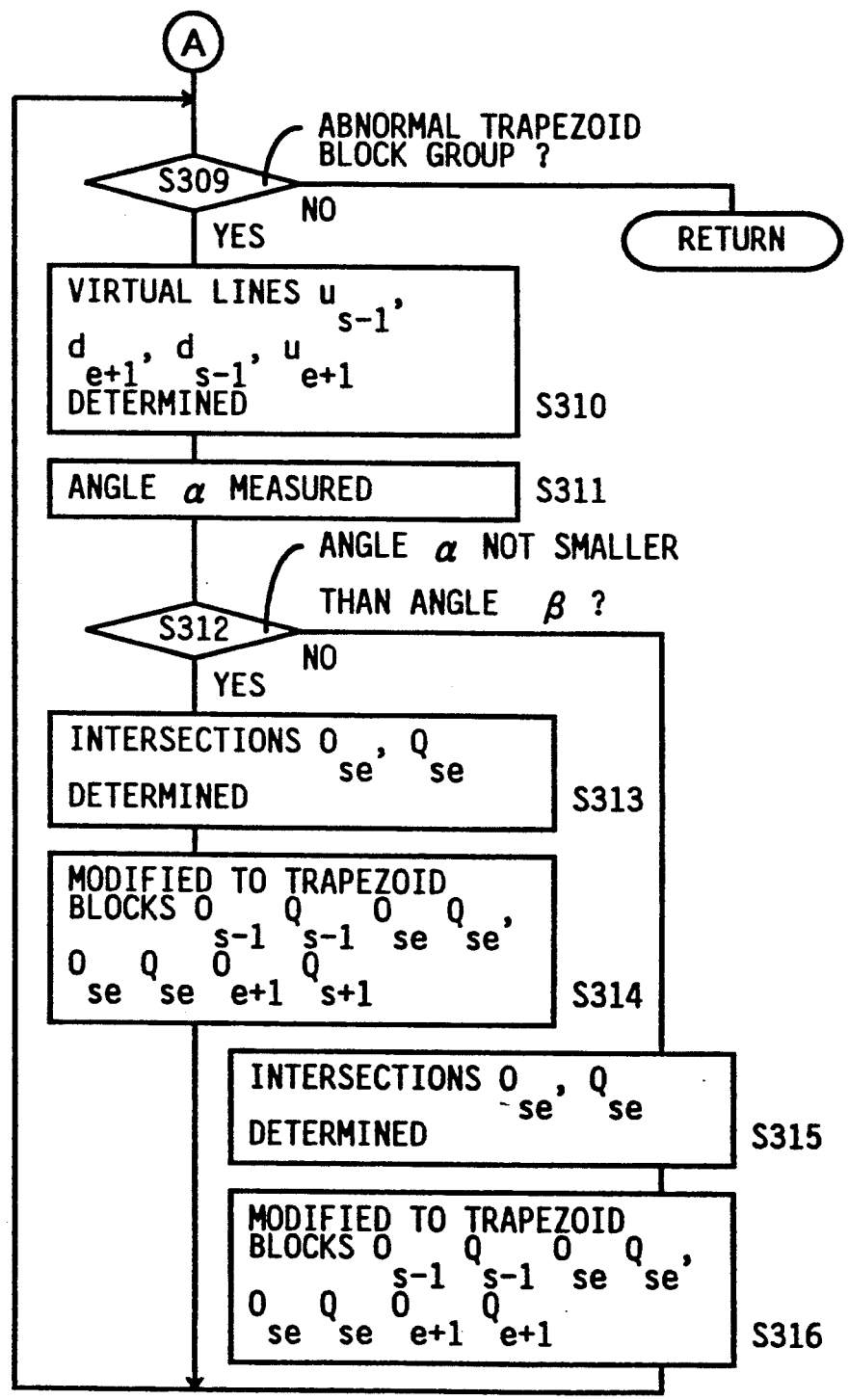

Step S3 of FIG. 4, that is, trapezoid block determine step consists of substeps of the flow chart of FIG. 5.

Figure 6:
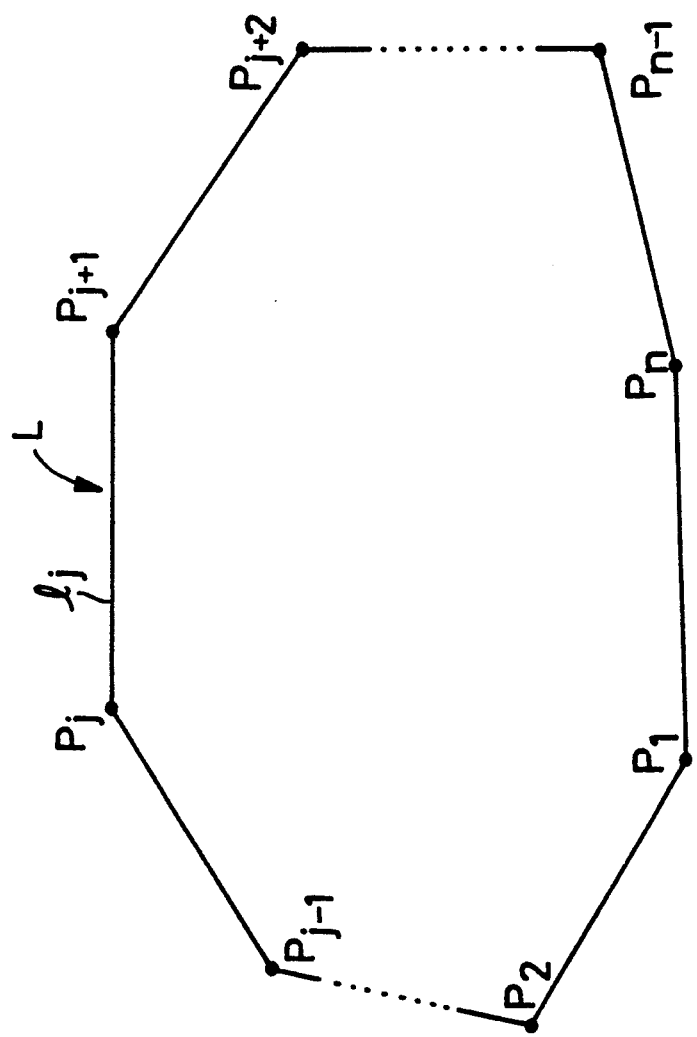
FIGS. 6 through 14 are views for explaining the embroidery data processing operation carried out by the data processing apparatus of the invention.

First, the control of the CPU 40 starts with Step S301 to determine a series of straight line segments, $l_j$, each of which connects between a corresponding one of pairs of adjacent two points, $P_j$ and $P_{j+1}$, out of a series of point indicated by the point data stored in the point data area 64. In the case where the series of points indicated by the stored point data are, for example, points $P_1 \ldots P_n$ ($P_{n+1}$ coincides with $P_1$) shown in FIG. 6, points $P_n$ define a polygonal line, L, which in turn defines an embroidery figure in which zigzag stitches are formed with a width, h, indicated by the width data stored in the width data area 66. In this case, the stored group of point data consist of sets of coordinate data each of which represents X and Y coordinate values of a corresponding one of points $P_n$ in an X-Y orthogonal coordinate system. Based on the X and Y coordinates of each pair of adjacent two points $P_j$ and $P_{j+1}$, the CPU 40 determines a corresponding one of straight line segments $l_j$ connecting therebetween.

Subsequently, the control goes to Step S302 to determine a pair of virtual straight lines, $u_j$ and $d_j$, with respect to each of line segments $l_j$, such that two virtual lines $u_j$ and $d_j$ are parallel to the each line segment $l_j$ and are spaced apart from the each line segment $l_j$, each by half the width h. Step S302 is followed by Step S303 to determine a series of intersections, $O_j$, of pairs of adjacent two virtual line, $u_{j-1}$ and $u_j$, and a series of intersections, $Q_j$, of pairs of adjacent two virtual line $d_{j-1}$ and $d_j$. Four intersections $O_j$, $Q_j$, $Q_{j+1}$, $O_{j+1}$ corresponding to the each line segment $l_j$ cooperate with each other to define a trapezoid block, $t_j$. Each of trapezoid blocks $t_j$ has a shape of trapezoid, and is bounded by (a) a first base (first side) connecting between intersections $O_j$, $O_{j+1}$, (b) a second base (second side) connecting between intersections $Q_j$, $Q_{j+1}$, (c) a first leg (third side) connecting between intersections $O_j$, $Q_j$, and (d) a second leg (fourth side) connecting between intersections $O_{j+1}$, $Q_{j+1}$. The first and second bases of each trapezoid block $t_j$ are parallel to each other.

Figure 7:
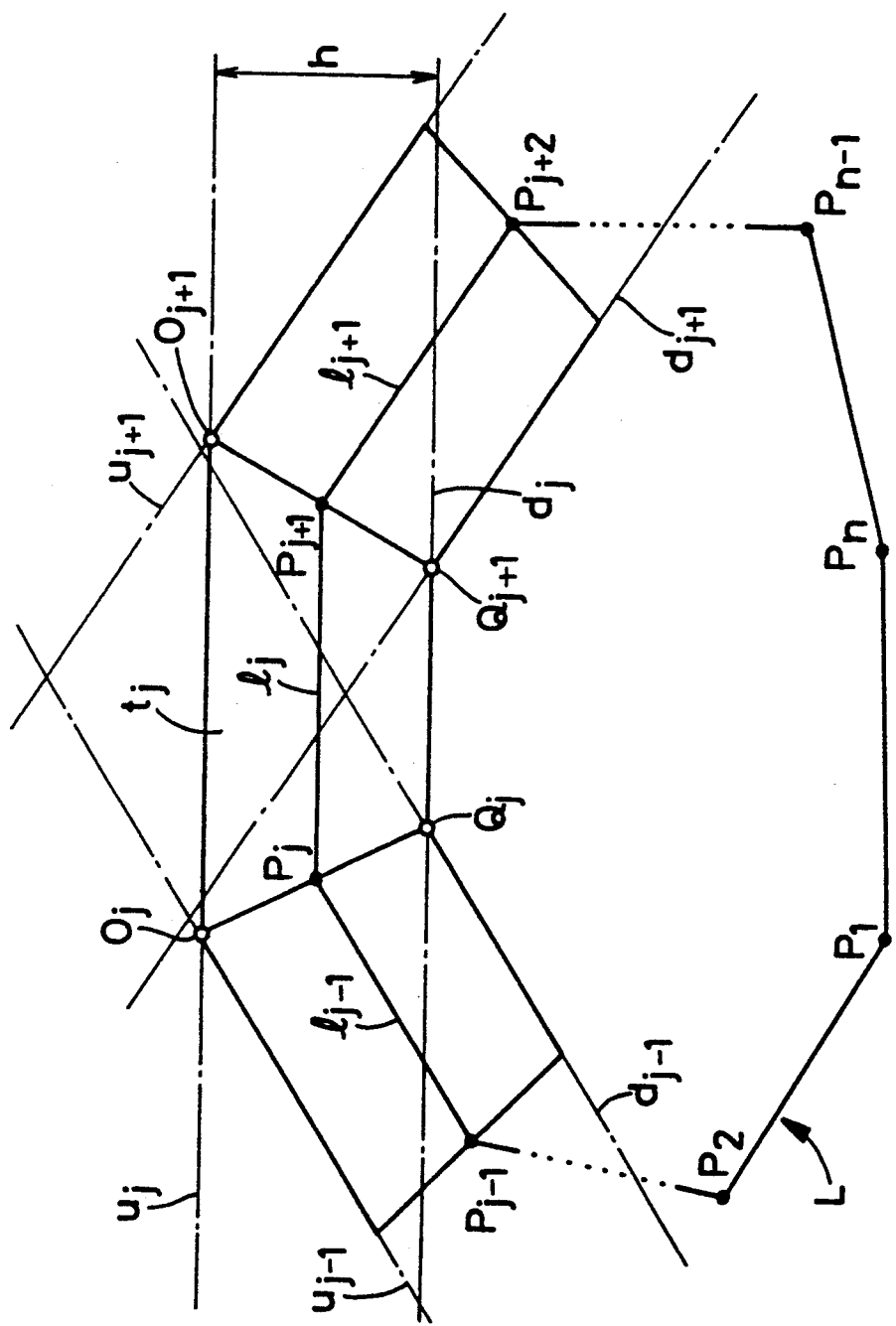
Figure 8:
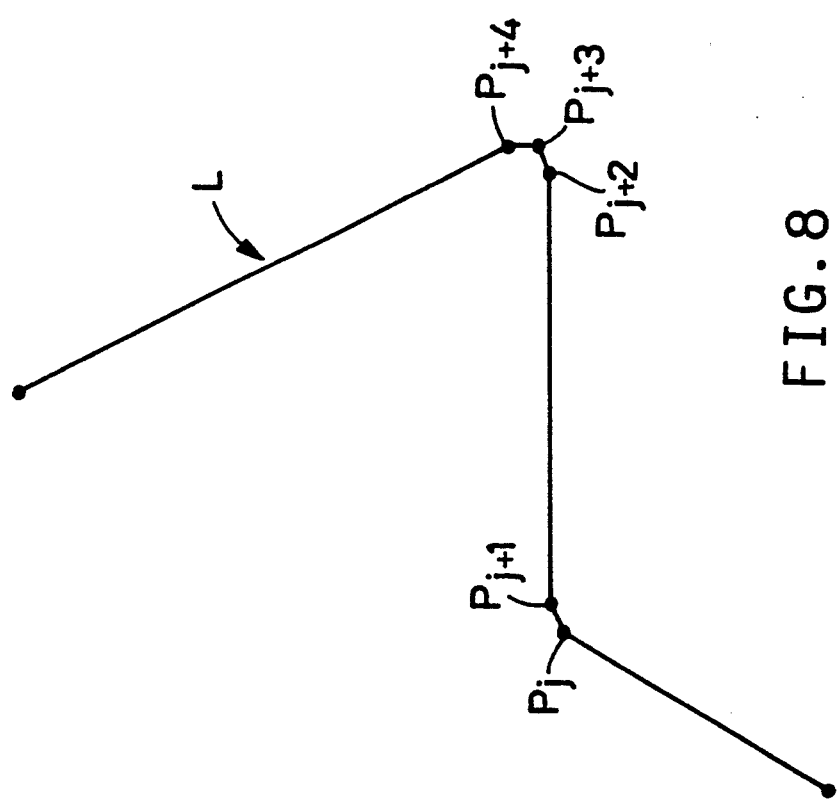
Figure 9:
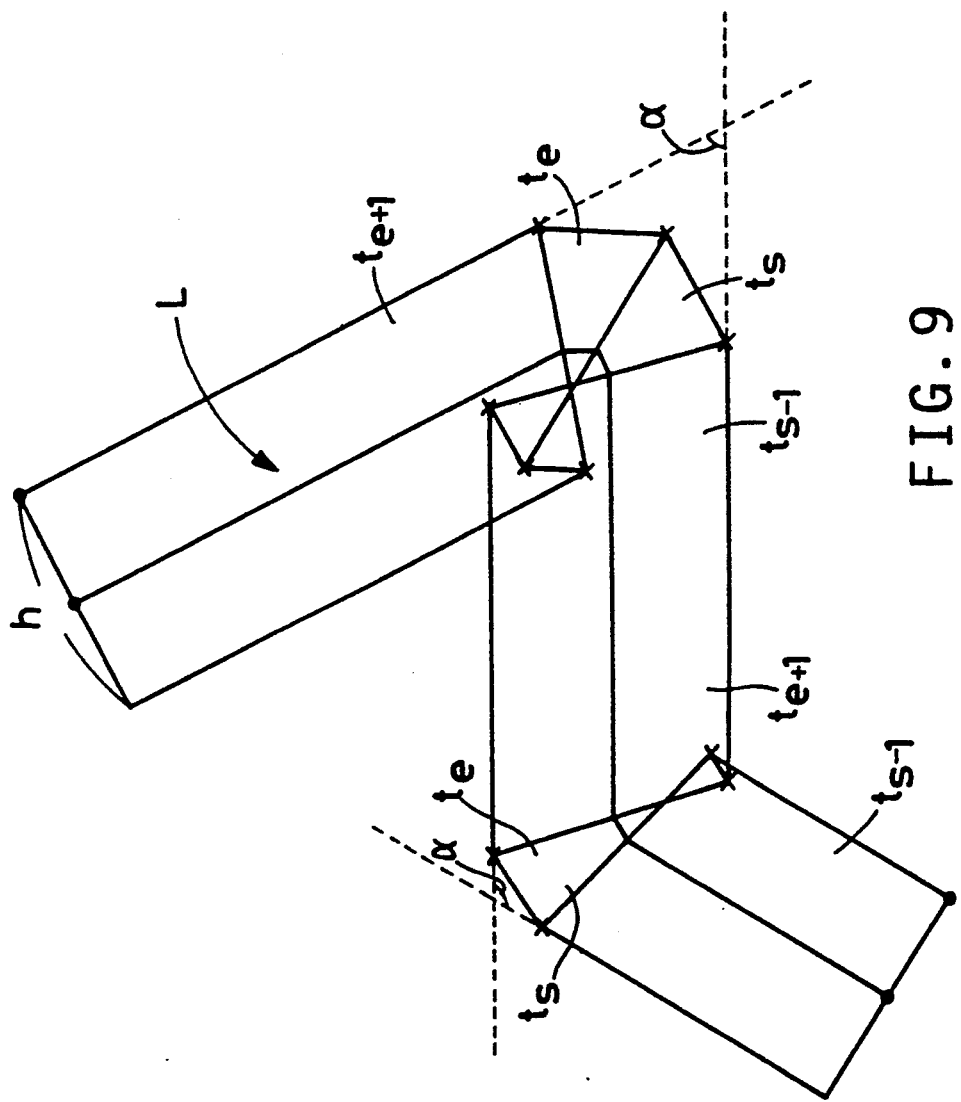

Step S303 is followed by Step S304 to judge whether or not the first and second legs of a first one of trapezoid blocks $t_j$ intersect each other. In the event that zigzag stitch width h is small in comparison with a length of a line segment $l_j$ corresponding to the first trapezoid block, the first trapezoid block is not an abnormal trapezoid block whose two legs intersect each other. Each of trapezoid blocks $t_j$ shown in FIG. 7 is a normal trapezoid block whose legs do not intersect each other. If a negative judgement (NO) is made in Step S304, the control goes to Step S306 in which a flag associated with the first trapezoid block is set to zero (F=0). On the other hand, as to a series of points defining a polygonal line, L, shown in FIG. 8, a line segment connecting between adjacent two points, $P_j$ and $P_{j+1}$, and line segments connecting between adjacent two points, $P_{j+2}$ and $P_{j+3}$, and between adjacent two points, $P_{j+3}$ and $P_{j+4}$, are short relatively to zigzag stitch width h. In this example, abnormal trapezoid blocks each having intersecting legs are produced as blocks, as shown in FIG. 9. The abnormal trapezoid blocks obtained from the figure defined by polygonal line L of FIG. 9 include a single abnormal trapezoid block sandwiched by, and between, two normal trapezoid blocks adjacent to, and on both sides of, the single abnormal trapezoid block, and two continuous abnormal trapezoid blocks sandwiched by, and between, two normal trapezoid blocks adjacent to, and on both sides of, the abnormal trapezoid block group consisting of the two continuous abnormal trapezoid blocks. Hereinafter, the first block of an abnormal trapezoid block group consisting of one or more continuous abnormal trapezoid blocks is referred to as block $t_s$ and the last block of the same is referred to as block $t_e$. Accordingly, the single abnormal trapezoid block in a left-hand portion of FIG. 9 is block $t_s$ and at the same time block $t_e$, and the two continuous abnormal trapezoid blocks in a right-hand portion of FIG. 9 are block $t_s$ and block $t_e$, respectively. In addition, the two normal trapezoid blocks adjacent to and on both sides of an abnormal trapezoid block group consisting of one or more continuous abnormal trapezoid blocks, are referred to as blocks $t_{s-1}$ and $t_{e+1}$, respectively. If an affirmative judgement (YES) is made in Step S304, namely, if the block being checked in this step is found to be an abnormal trapezoid block, the control goes to Step S305 in which a flag associated with the block is set to 1 (F=1), indicating that the block is an abnormal trapezoid block having intersecting legs.

Each of Steps S305 and S306 is followed by Step S307 to store a set of block data representative of the block being checked, together with the flag associated with the block, in the block data area 68 of the RAM 44.

Subsequently, the control goes to Step S308 to judge whether or not all the trapezoid blocks obtained from the series of points have been subjected to Steps S304 through S307. So long as a negative judgement is made in Step S308, the control of the CPU 40 repetitively effects Steps S304-S307.

If an affirmative judgement is made in Step S308, the control goes to Step S309 and the following steps to modify one or more continuous abnormal trapezoid blocks, namely, abnormal trapezoid block group, together with two normal trapezoid blocks sandwiching the abnormal trapezoid block group, into two new normal trapezoid blocks.

In Step S309, each of the sets of block data stored in the block data area 68 is checked for a flag set at F=1, for finding an abnormal trapezoid block group consisting of one or more continuous abnormal trapezoid blocks. Each time an abnormal trapezoid block group is found, namely, if an affirmative judgement is made in Step S309, the control goes to Step S310 and the following steps. In the event that, for example, the single abnormal trapezoid block $t_s$ (at the same time, block $t_e$) in the left-hand portion of FIG. 9 is found, the block $t_s$ and two normal trapezoid blocks, $t_{s-1}$ and $t_{e+1}$, on both sides of block $t_s$ are modified to two new normal trapezoid blocks. More specifically, in Step S310, two virtual straight lines, $u_{s-1}$ and $d_{s-1}$, are determined with respect to line segment $l_{s-1}$ corresponding to normal trapezoid $t_{s-1}$, such that two virtual lines, $u_{s-1}$ and $d_{s-1}$, are parallel to line segment $l_{s-1}$ and are spaced apart from line segment $l_{s-1}$ each by half the width h. Similarly, two virtual straight lines, $u_{e+1}$, $d_{e+1}$, are determined with respect to line segment $l_{e+1}$ corresponding to normal trapezoid $t_{e+1}$, such that two virtual lines $u_{e+1}$, $d_{e+1}$ are parallel to line segment $l_{e+1}$ and are spaced apart from line segment $l_{e+1}$ each by half the width h. Step S310 is followed by Step S311 to determine a value, $\alpha$, of a smaller one of two angles contained by respective prolonged lines of line segments $l_{s-1}$, $l_{e+1}$. It is noted that angle is equal to a smaller one of two angles contained by two virtual lines $u_{e-1}$, $u_{e+1}$, and a smaller one of two angles contained by two virtual lines $d_{e-1}$, $d_{e+1}$.

Figure 10:
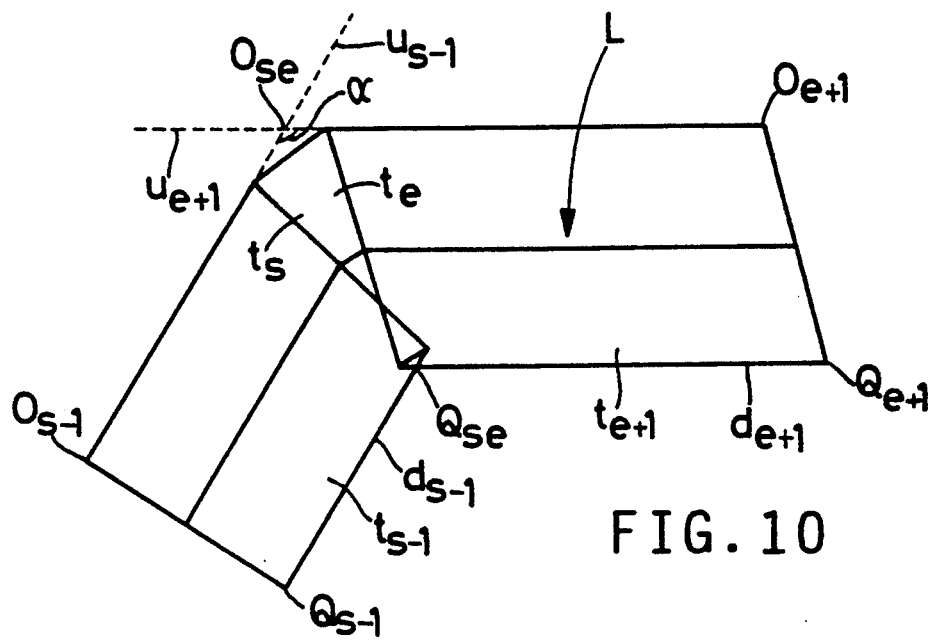
Figure 12:
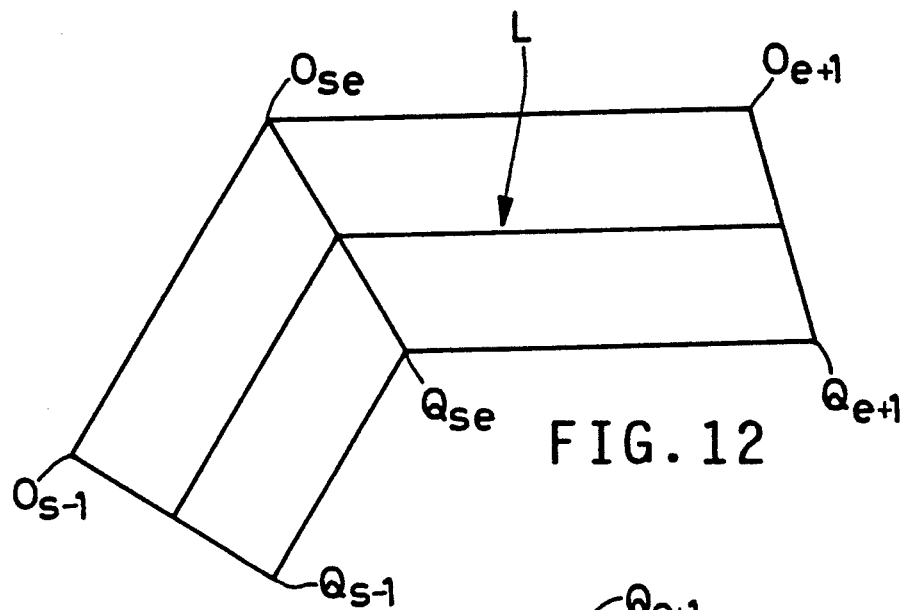

Step S311 is followed by Step S312 to judge whether or not angle is not smaller than a reference angle, $\beta$ (e.g., 90 degrees). If an affirmative judgement is made in Step S312, the control goes to Step S313 to determine an intersection, $O_{se}$, of virtual lines $u_{s-1}$, $u_{e+1}$, and an intersection, $Q_{se}$, of virtual lines $d_{s-1}$, $d_{e+1}$, as shown in FIG. 10. Step S313 is followed by Step S314 to modify the three sets of block data for one abnormal trapezoid block $t_s$ and two normal trapezoid blocks $t_{s-1}$, $t_{e+1}$ on both sides of block $t_s$ into two sets of block data for two new normal trapezoid blocks, $O_{s-1}Q_{s-1}Q_{se}O_{se}$ and $O_{se}Q_{se}Q_{e+1}O_{e+1}$, as illustrated in FIG. 12.

Figure 11:
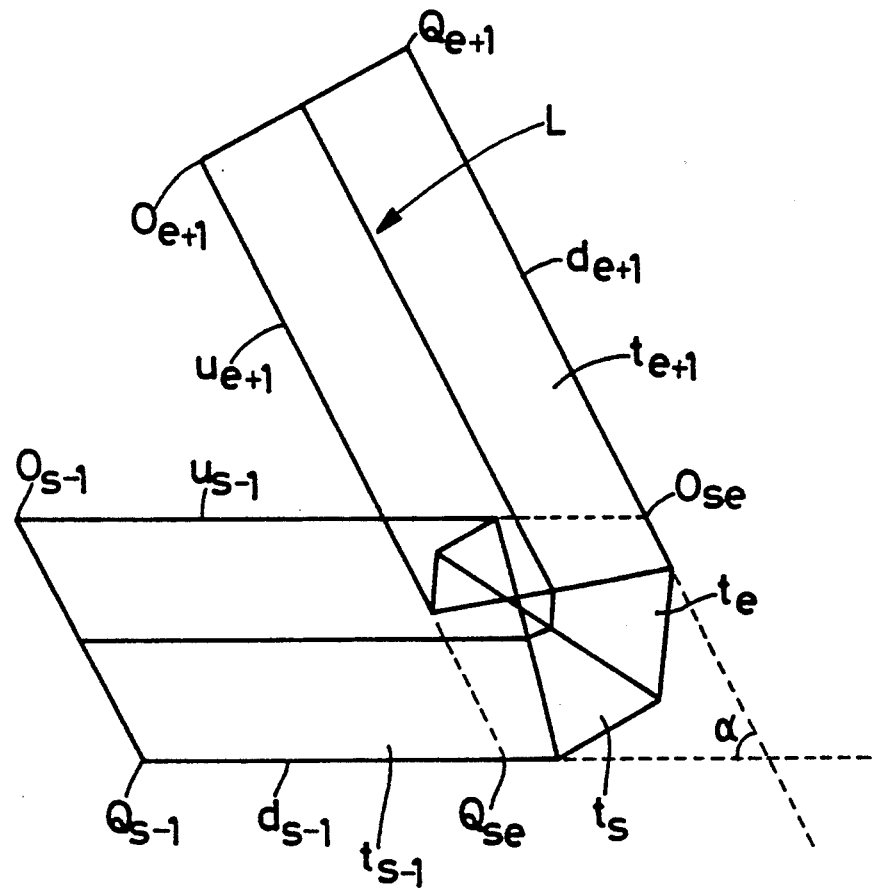
Figure 13:
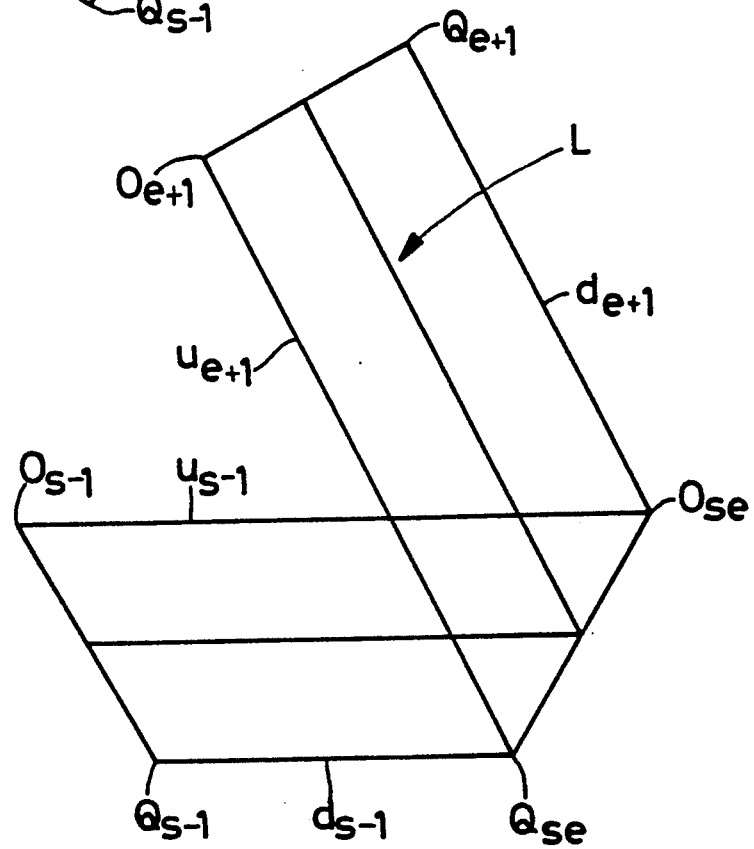

After Steps S313 and S314, the control goes back to Step S309 to find another abnormal trapezoid block group. In the event that, for example, the abnormal trapezoid blocks $t_s$, $t_e$ in the right-hand portion of FIG. 9, the two abnormal trapezoid blocks $t_s$, $t_e$, a normal trapezoid block $t_{s-1}$ (i.e., normal trapezoid block $O_{se}Q_{se}Q_{e+1}O_{e+1}$ produced in the previous processing cycle), and a normal trapezoid block $t_{e+1}$ are subjected to Steps S310 and the following steps. In this case, angle $\alpha$ is smaller than angle $\alpha$, as shown in FIG. 11. Accordingly, a negative judgement is made in Step S312, and the control goes to Step S315 to determine an intersection, $O_{se}$, of virtual lines $u_{s-1}$, $d_{e+1}$, and an intersection, $Q_{se}$, of virtual lines $d_{s-1}$, $u_{e+1}$. Step S315 is followed by Step S316 to modify the four sets of block data for two abnormal trapezoid blocks $t_s$, $t_e$ and two normal trapezoid blocks $t_{e-1}$, $t_{e+1}$ into two sets of block data for two new normal trapezoid blocks, $O_{s-1}Q_{s-1}Q_{se}O_{se}$ and $O_{se}Q_{se}Q_{e+1}O_{e+1}$, as illustrated in FIG. 13.

While Steps S309 through S316 are repeated, all abnormal trapezoid block groups are modified into normal trapezoid blocks, and eventually a negative judgement is made in Step S309. Thus, a trapezoid block modify operation for the embroidery figure is ended. It is noted that, in the case where the sets of block data stored in the block data area 68 contain no block data for an abnormal trapezoid block, Steps S310 through S316 are not effected, and the sets of block data produced in Step S307 are used as embroidery data without any modification.

Figure 14:
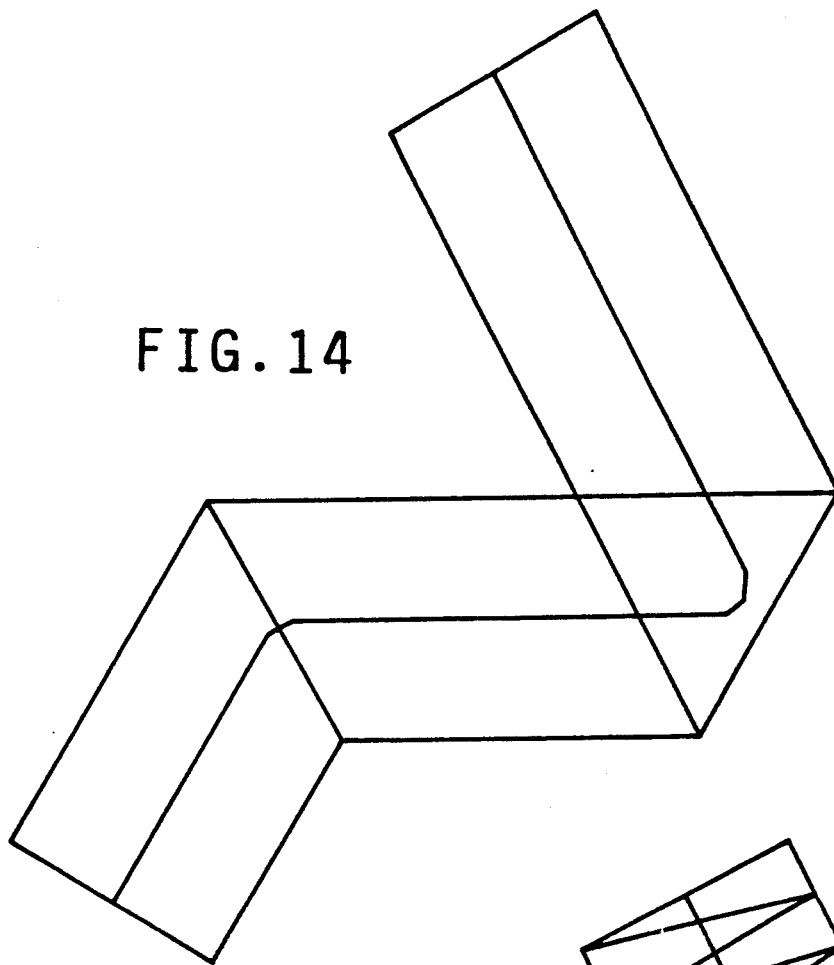

Thus, the embroidery figure of FIG. 9 including abnormal trapezoid blocks is modified into the embroidery figure of FIG. 14 consisting of normal trapezoid blocks only.

Figure 15:
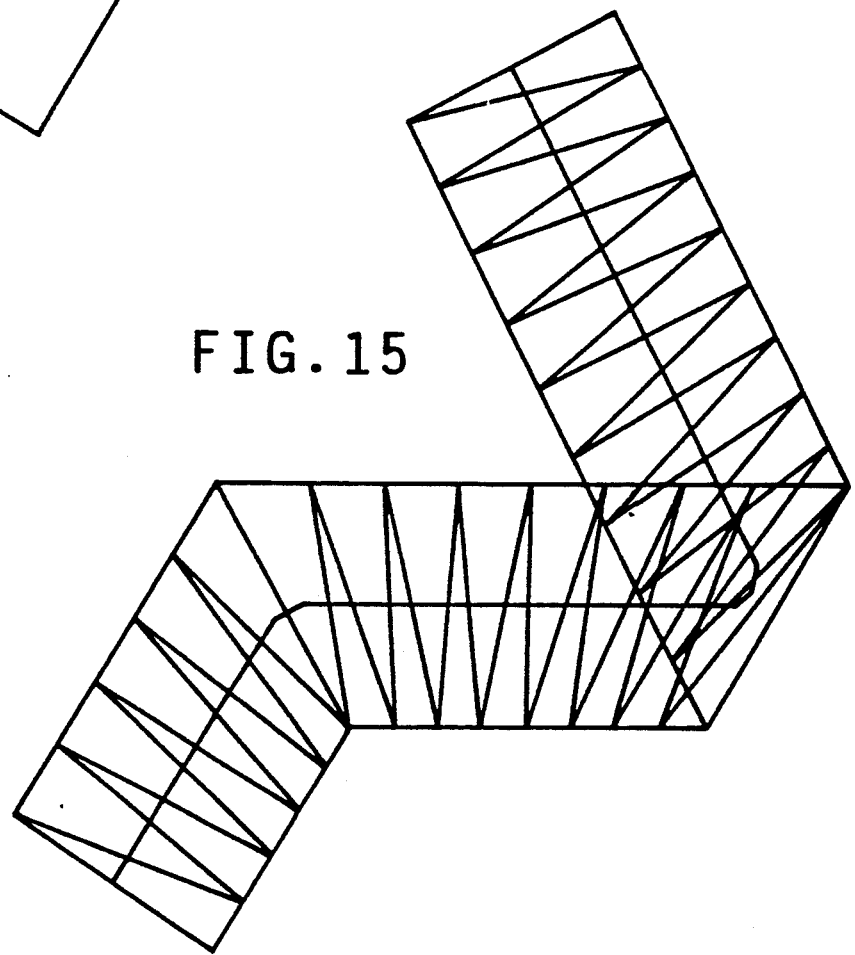
FIG. 15 is an illustrative view of an example of a figure embroidered by utilizing embroidery data produced by the data processing apparatus of the invention.

When the normal trapezoid blocks of FIG. 14 are actually embroidered, first, a length of a line segment connecting between respective middle points of the two legs of each normal trapezoid block is multiplied by a predetermined density of stitches (i.e., number of stitches formed per unit length), and the product rounded to an integer number is used for dividing a length of each of the two bases of the each trapezoid and thereby determining stitch positions on the each base where the stitch needle 18 goes through the workpiece W. Each of the trapezoid blocks of the embroidery figure is filled with zigzag stitches formed by alternately connecting between the stitch positions on one of the two bases thereof and the stitch positions on the other base thereof, as shown in FIG. 15.

Figure 16:
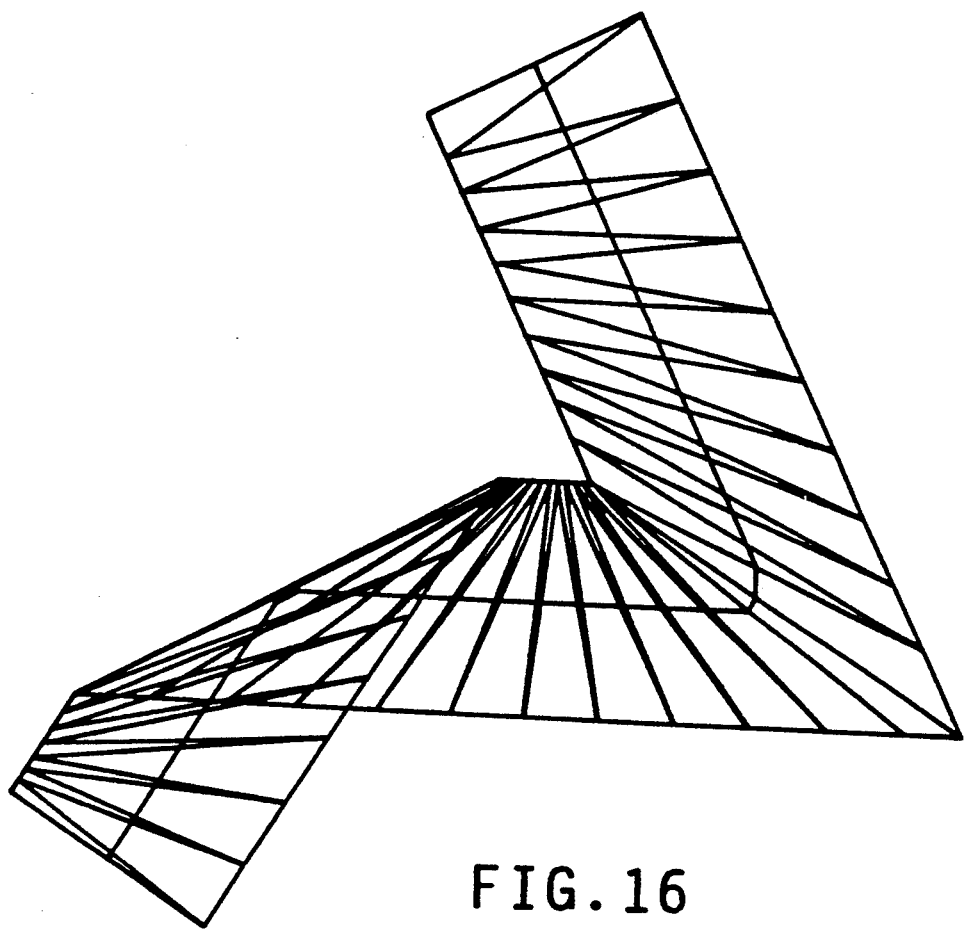
FIG. 16 is an illustrative view corresponding to FIG. 15, for comparison of the embroidery of FIG. 15 with an embroidery formed by utilizing embroidery data produced in a trapezoid block modifying way different from that used in the data processing apparatus of the invention.

If Step S312 is adapted such that affirmative and negative judgements are made in the converse way, that is, if Steps S315 and S316 are effected when angle $\alpha$ is not smaller than angle $\beta$ and Steps S313 and S314 are effected when angle $\alpha$ is smaller than angle $\beta$, the trapezoid blocks of FIG. 9 are modified into blocks of FIG. 16, and zigzag stitches are formed in the blocks as shown in FIG. 16. By comparing the zigzag stitches of FIG. 16 with the zigzag stitches of FIG. 15 formed by utilizing the block data produced by the present data processing apparatus, it is clearly understood that the embroidery formed by using the embroidery data processed in the present embodiment is more excellent than that of FIG. 16. This is why the trapezoid blocks of FIG. 16 have a greater difference between lengths of the two bases thereof than the trapezoid blocks of FIG. 14 and therefore have a greater difference between respective densities of stitches formed on the two bases thereof than the trapezoid blocks of FIG. 15.

As is apparent from the foregoing description of the present embodiment, the point data area 64 of the RAM 44 serves as means for storing point data indicative of positions of a series of points, and the width data area 66 of the RAM 44 serves as means for storing width data indicative of a predetermined zigzag stitch width. In addition, a portion of the CPU 40, ROM 42 and RAM 44 which effects Steps S301 through S308, serves as means for producing block data representative of trapezoid blocks, and the block data area 68 of the RAM 44 serves as means for storing block data. Further, a portion of the CPU 40, ROM 42 and RAM 44 which effects Steps S309, S313 and S314, serves as first trapezoid block modifying means, while a portion of the CPU 40, ROM 42 and RAM 44 which effects Steps S309, S315 and S316, serves as second trapezoid block modifying means. A portion of the CPU 40, ROM 42 and RAM 44 which effects Steps S310 through S312, serves as means for selecting the first or second trapezoid block modifying means.

Figure 17:
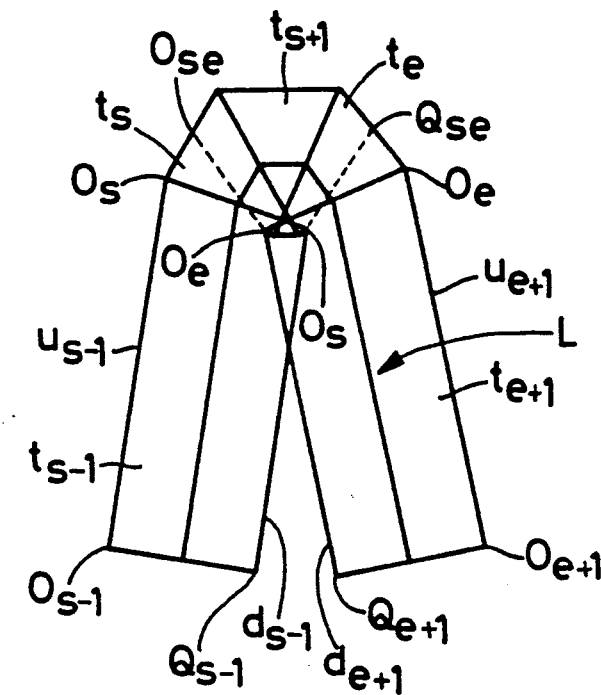
FIGS. 17 through 20 are views for explaining trapezoid block modifying ways used in other embodiments of the present invention.
Figure 18:
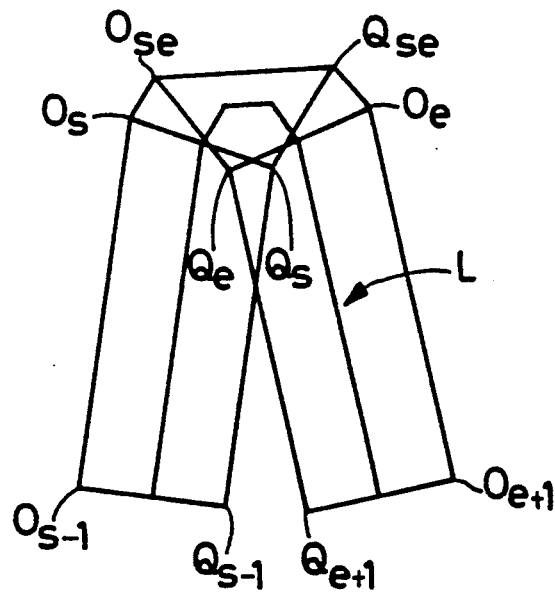
Figure 19:
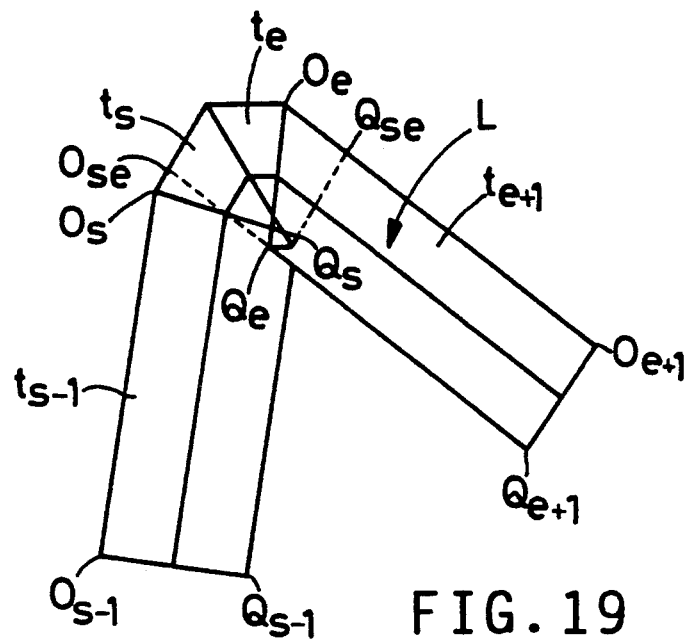
Figure 20:
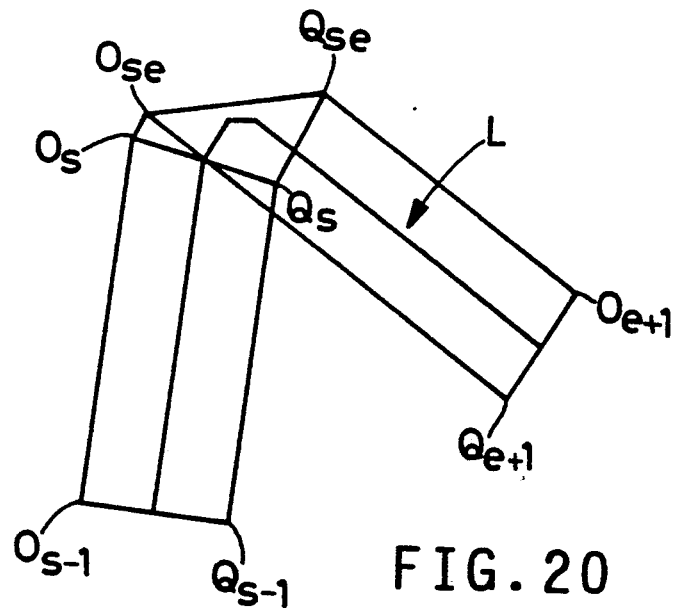
Figure 21:
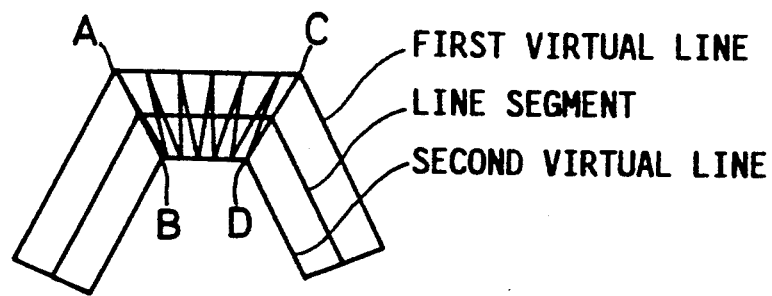
FIGS. 21 and 22 are views for explaining problems with an embroidery data processing apparatus proposed by the Assignee of the present U.S. patent application.
Figure 22:
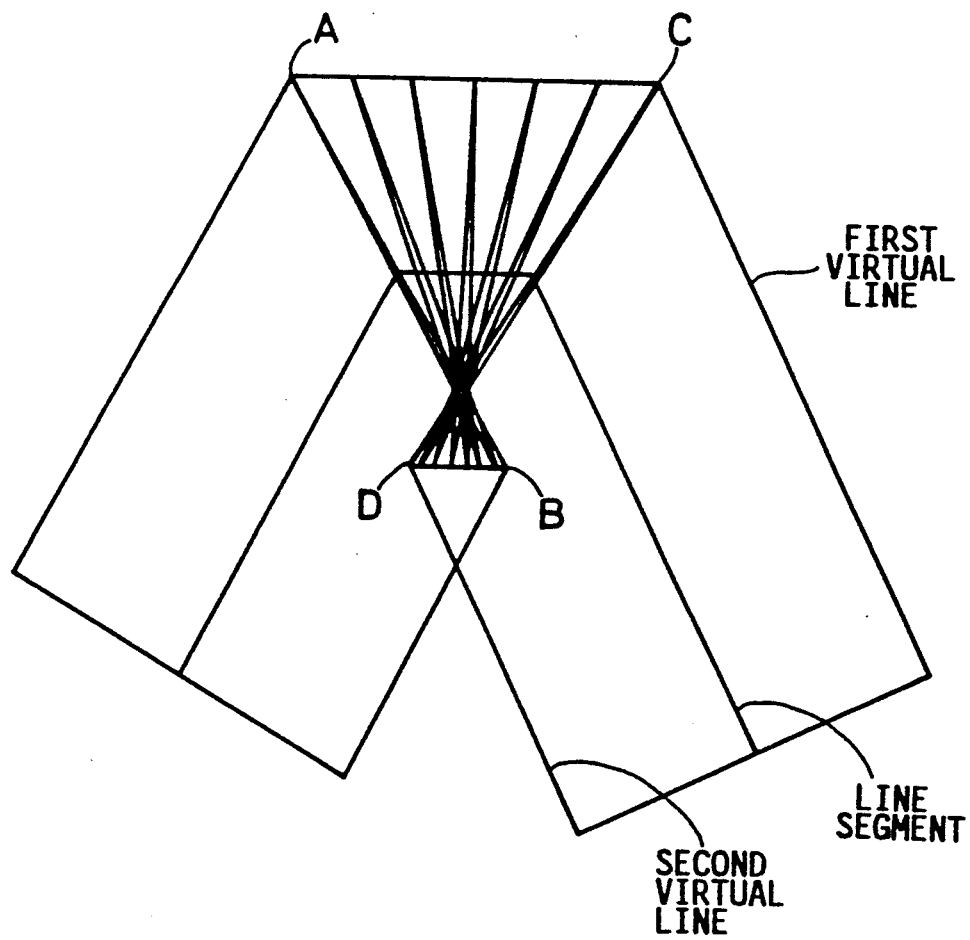

In the illustrated embodiment, in the event that the trapezoid blocks of an embroidery figure include a group of continuous abnormal trapezoid blocks, both the first and second trapezoid block modifying means modify the abnormal trapezoid blocks and two normal trapezoid blocks on both sides thereof, into two new normal trapezoid blocks. However, depending upon shapes of embroidery figures or lines defining the embroidery figures, there are some cases wherein it is possible to modify at least two continuous abnormal trapezoid blocks into two normal trapezoid blocks. As to three continuous abnormal trapezoid blocks, $t_s$, $t_{s+1}$ and $t_e$, shown in FIG. 17, for example, it is possible to modify the three abnormal trapezoid blocks into two normal trapezoid blocks, $O_sQ_sQ_{se}O_{se}$ and $O_{se}Q_{se}Q_eO_e$, shown in FIG. 18. In addition, as to two continuous abnormal trapezoid blocks, $t_s$ and $t_e$, shown in FIG. 19, it is possible to modify the two abnormal trapezoid blocks and a normal trapezoid block, $t_{e+1}$, on one side thereof into two normal trapezoid blocks, $O_sQ_sQ_{se}O_{se}$ and $O_{se}Q_{se}Q_{e+1}O_{e+1}$, shown in FIG. 20. The second trapezoid block modifying means of the illustrated embodiment may be adapted to operate in the above described second or third manner.

Although, in the illustrated embodiment, the embroidery data processing apparatus is constructed to be an integral part of the control device 39 of the automatic sewing machine 8, it is possible to adapt the embroidery data processing apparatus to be separate from the automatic sewing machine 8. In this case, the embroidery data produced by the data processing apparatus may be stored in a recording medium such as a magnetic disc or tape, and embroidering may be carried out by the magnetic disc or tape being inserted into a reading device of a sewing machine and utilized by a control computer of the sewing machine.

In the illustrated embodiment, in the event that the trapezoid blocks of an embroidery figure include no abnormal trapezoid block, namely, consist of normal trapezoid blocks only, none of the blocks are not modified. However, as to normal trapezoid blocks characterized by a great ratio of a length of one of the two bases to that of the other base and accordingly a great difference between respective stitch densities for the two bases, there are some cases wherein it is possible to modify such a block and at least one normal trapezoid block adjacent thereto into one or more new normal trapezoid blocks. The data processing apparatus may be adapted to effect such a modification.

While the present invention has been described in its presently preferred embodiments, it is to be understood that the present invention is by not means limited to the details of the illustrated embodiment but may be embodied with various changes, improvements and modifications that may occur to those skilled in the art without departing from the scope and spirit of the invention defined in the appended claims.

What is claimed is:

1. A data processing apparatus for processing embroidery data utilized by a sewing machine for forming zigzag stitches, comprising:

first storing means for storing point data indicative of positions of a series of points on a line defining a figure in which said zigzag stitches are formed with a predetermined width;

second storing means for storing width data indicative of said predetermined width of said zigzag stitches;

producing means for, by utilizing said point data and said width data, determining a first and a second virtual straight line with respect to each of straight line segments each of which connects between a corresponding one of pairs of adjacent two points out of said series of points, such that said first and second virtual lines are parallel to said each line segment and are spaced apart from each other by said predetermined width, said producing means producing block data representative of a trapezoid bounded by (a) a first base connecting between a first intersection between said first virtual line corresponding to said each line segment and the first virtual line corresponding to one of the two line segments adjacent to, and on both sides of, said each line segment, and a second intersection between said first virtual line corresponding to said each line segment and the first virtual line corresponding to the other of said two line segments, (b) a second base connecting between a third intersection between said second virtual line corresponding to said each line segment and the second virtual line corresponding to said one of said two line segments, and a fourth intersection between said second virtual line corresponding to said each line segment and the second virtual line corresponding to said other of said two line segments, (c) a first leg connecting between said first and third intersections, and (d) a second leg connecting between said second and fourth intersections; and modifying means for, if said trapezoid is an abnormal trapezoid characterized in that said first and second legs intersect each other, modifying said block data into different block data representative of a normal trapezoid having two legs which do not intersect each other.

2. The data processing apparatus according to claim 1, wherein said modifying means comprises first means for, if trapezoids represented by sets of block data produced by said producing means include an abnormal trapezoid group consisting of one or more continuous abnormal trapezoids and two normal trapezoids adjacent to, and on both sides of, said abnormal trapezoid group, modifying said one or more abnormal trapezoids and said adjacent two normal trapezoids, into two new normal trapezoids which have a common leg connecting between an intersection of the two first virtual lines corresponding to said adjacent two normal trapezoids and an intersection of the two second virtual lines corresponding to the adjacent two normal trapezoids, each of said two new normal trapezoids having, as a leg thereof different from said common leg, a distant one of the two legs of a corresponding one of the adjacent two normal trapezoids, said distant one leg being spaced apart from said trapezoid group.

3. The data processing apparatus according to claim 1, wherein said modifying means comprises second means for, if trapezoids represented by sets of block data produced by said producing means include an abnormal trapezoid group consisting of one or more continuous abnormal trapezoids, modifying said abnormal trapezoid group and two trapezoids adjacent to, and on both sides of, said abnormal trapezoid group, into two normal trapezoids which have a common leg connecting between an intersection of the first virtual line corresponding to one of said adjacent two trapezoids and the second virtual line corresponding to the other of the adjacent two trapezoids, and an intersection of the second virtual line corresponding to said one of the adjacent two trapezoids and the first virtual line corresponding to said other of the adjacent two trapezoids, each of said two normal trapezoids having, as a leg thereof different from said common leg, a distant one of the two legs of a corresponding one of the adjacent two trapezoids, said distant one leg being spaced apart from said abnormal trapezoid.

4. The data processing apparatus according to claim 3, wherein said second means of said modifying means modifies said abnormal trapezoid group consisting of said one or more continuous abnormal trapezoids and two normal trapezoids adjacent to, and on both sides of, said abnormal trapezoid group, into two new normal trapezoids.

5. The data processing apparatus according to claim 3, wherein said second means of said modifying means modifies said abnormal trapezoid group consisting of two or more continuous abnormal trapezoids and a normal trapezoid adjacent to, and on one side of, said abnormal trapezoid group, into two new normal trapezoids.

6. The data processing apparatus according to claim 3, wherein said second means of said modifying means modifies said abnormal trapezoid group consisting of three or more continuous abnormal trapezoids, into two normal trapezoids.

7. The data processing apparatus according to claim 1, wherein said modifying means comprises:
  first means for, if trapezoids represented by sets of block data produced by said producing means include a first abnormal trapezoid group consisting of one or more continuous abnormal trapezoids and two normal trapezoids adjacent to, and on both sides of, said first abnormal trapezoid group, modifying said one or more abnormal trapezoids and said adjacent two normal trapezoids, into two first normal trapezoids which have a common leg connecting between an intersection of the two first virtual lines corresponding to said adjacent two normal trapezoids and an intersection of the two second virtual lines corresponding to the adjacent two normal trapezoids, each of said two first normal trapezoids having, as a leg thereof different from said common leg thereof, a distant one of the two legs of a corresponding one of the adjacent two normal trapezoids, said distant one leg being spaced apart from said trapezoid group;
  second means for, if said trapezoids represented by said sets of block data include a second abnormal trapezoid group consisting of one or more continuous abnormal trapezoids, modifying said second abnormal trapezoid group and two trapezoids adjacent to, and on both sides of, the second abnormal trapezoid group, into two second normal trapezoids which have a common leg connecting between an intersection of the first virtual line corresponding to one of said adjacent two trapezoids and the second virtual line corresponding to the other of the adjacent two trapezoids, and an intersection of the second virtual line corresponding to said one of the adjacent two trapezoids and the first virtual line corresponding to said other of the adjacent two trapezoids, each of said two second normal trapezoids having, as a leg thereof different from said common leg thereof, a distant one of the two legs of a corresponding one of the adjacent two trapezoids, said distant one leg of said each second normal trapezoid being spaced apart from said abnormal trapezoid; and
  select means for selecting one of said first and second means.

8. The data processing apparatus according to claim 7, wherein said select means of said modifying means selects said first or second means based on a parameter associated with the figure-defining line.

9. The data processing apparatus according to claim 8, wherein said select means selects said first means if a smaller one of two angles contained by prolonged lines of the two straight line segments corresponding to said two normal trapezoids adjacent to said abnormal trapezoid group exceeds a reference angle, and selects said second means if otherwise.

10. The data processing apparatus according to claim 9, wherein said reference angle is 90 degrees.

11. The data processing apparatus according to claim 7, wherein said select means of said modifying means is operated by an operator for selecting said first or second means.

12. The data processing apparatus according to claim 1, wherein each of said first and second virtual straight lines is spaced apart from said each straight line segment by a same distance.

13. The data processing apparatus according to claim 1, further comprising changing means operated by an operator for changing said width data stored in said second storing means, into different width data indicative of a different width.

14. The data processing apparatus according to claim 1, further comprising:
  checking means for checking each of the trapezoids represented by sets of block data produced by said producing means as to whether or not said each trapezoid is an abnormal trapezoid; and
  third storing means for storing data indicative of an affirmative or negative judgement in association with a corresponding set of block data.

15. A sewing machine for forming zigzag stitches, comprising:
  first storing means for storing point data indicative of positions of a series of points on a line defining a figure in which said zigzag stitches are formed with a predetermined width;
  second storing means for storing width data indicative of said predetermined width of said zigzag stitches;
  first producing means for, by utilizing said point data and said width data, determining a first and a second virtual straight line with respect to each of straight line segments each of which connects between a corresponding one of pairs of adjacent two points out of said series of points, such that said first and second virtual lines are parallel to said each line segment and are spaced apart from each other by said predetermined width, said producing means producing block data representative of a trapezoid bounded by (a) a first base connecting between a first intersection between said first virtual line corresponding to said each line segment and the first virtual line corresponding to one of the two line segments adjacent to, and on both sides of, said each line segment, and a second intersection between said first virtual line corresponding to said each line segment and the first virtual line corresponding to the other of said two line segments, (b) a second base connecting between a third intersection between said second virtual line corresponding to said each line segment and the second virtual line corresponding to said one of said two line segments, and a fourth intersection between said second virtual line corresponding to said each line segment and the second virtual line corresponding to said other of said two line segments, (c) a first leg connecting between said first and third intersections, and (d) a second leg connecting between said second and fourth intersections;

modifying means for, if said trapezoid is an abnormal trapezoid characterized in that said first and second legs intersect each other, modifying said block data into different block data representative of a normal trapezoid having two legs which do not intersect each other;

second producing means for producing, by utilizing said block data or said different block data, sets of stitch position data representative of stitch positions where a stitch needle penetrates a work fabric; and forming means for forming said zigzag stitches by utilizing said sets of stitch position data.

16. A sewing system for forming zigzag stitches, comprising:
(A) a data processing apparatus including
   (i) first storing means for storing point data indicative of positions of a series of points on a line defining a figure in which zigzag stitches are formed with a predetermined width,
   (ii) second storing means for storing width data indicative of said predetermined width of said zigzag stitches,
   (iii) producing means for, by utilizing said point data and said width data, determining a first and a second virtual straight line with respect to each of straight line segments each of which connects between a corresponding one of pairs of adjacent two points out of said series of points, such that said first and second virtual lines are parallel to said each line segment and are spaced apart from each other by said predetermined width, said producing means producing block data representative of a trapezoid bounded by (a) a first base connecting between a first intersection between said first virtual line corresponding to said each line segment and the first virtual line corresponding to one of the two line segments adjacent to, and on both sides, of, said each line segment, and a second intersection between said first virtual line corresponding to the other of said two line segments, (b) a second base connecting between a third intersection between said second virtual line corresponding to said each line segment and the second virtual line corresponding to said one of said two line segments, and a fourth intersection between said second virtual line corresponding to said each line segment and the second virtual line corresponding to said other of said two line segments, (c) a first leg connecting between said first and third intersections, and (d) a second leg connecting between said second and fourth intersections,
   (iv) modifying means for, if said trapezoid is an abnormal trapezoid characterized in that said first and second legs intersect each other, modifying said block data into different block data representative of a normal trapezoid having two legs which do not intersect each other, and
   (v) means for recording said block data or said different block data on a recording medium, and
(B) a sewing machine for forming said zigzag stitches by utilizing said block data or said different block data recorded on said recording medium.

17. A sewing system for forming zigzag stitches, comprising:
(A) a data processing apparatus including
   (i) first storing means for storing point data indicative of positions of a series of points on a line defining a figure in which zigzag stitches are formed with a predetermined width,
   (ii) second storing means for storing width data indicative of said predetermined width of said zigzag stitches,
   (iii) producing means for, by utilizing said point data and said width data, determining a first and a second virtual straight line with respect to each of straight line segments each of which connects between a corresponding one of pairs of adjacent two points out of said series of points, such that said first and second virtual lines are parallel to said each line segment and are spaced apart from each other by said predetermined width, said producing means producing block data representative of a trapezoid bounded by (a) a first base connecting between a first intersection between said first virtual line corresponding to one of the said two line segments adjacent to, and on both sides of, said each line segment, and a second intersection between said first virtual line corresponding to said each line segment and the first virtual line corresponding to the other of said two line segments, (b) a second base connecting between a third intersection between said second virtual line corresponding to said each line segment and the second virtual line corresponding to said one of said two line segments, and a fourth intersection between said second virtual line corresponding to said each line segment and the second virtual line corresponding to said other of said two line segments, (c) a first leg connecting between said first and third intersections, and (d) a second leg connecting between said second and fourth intersections,
   (iv) modifying means for, if said trapezoid is an abnormal trapezoid characterized in that said first and second legs intersect each other, modifying said block data into different block data representative of a normal trapezoid having two legs which do not intersect each other,
   (v) second producing means for producing, by utilizing said block data or said different block data, sets of stitch position data representative of stitch positions where a stitch needle penetrates a work fabric; and
   (vi) means for recording said sets of stitch position data on a recording medium, and
(B) a sewing machine for forming said zigzag stitches by utilizing said sets of stitch position data recorded on said recording medium.

* * * * *